(12) United States Patent
Janicek et al.

(10) Patent No.: US 6,670,881 B1
(45) Date of Patent: Dec. 30, 2003

(54) POSITIVE TEMPERATURE COEFFICIENT RESISTOR/OVERLOAD RESISTOR METHOD AND ASSEMBLIES

(75) Inventors: Alan J. Janicek, Morrison, IL (US); Kennett R. Fuller, Morrison, IL (US); Mark A. Heflin, Davenport, IA (US)

(73) Assignee: General Electric Company, Schenectady, NY (US)

( * ) Notice: Subject to any disclaimer, the term of this patent is extended or adjusted under 35 U.S.C. 154(b) by 18 days.

(21) Appl. No.: 09/682,155

(22) Filed: Jul. 27, 2001

(51) Int. Cl.[7] ................................................ H01C 7/13
(52) U.S. Cl. ...................... 338/22 R; 338/234; 338/236
(58) Field of Search .................... 338/22 R, 22 SD, 338/234, 236

(56) References Cited

U.S. PATENT DOCUMENTS

| | | | | |
|---|---|---|---|---|
| 4,166,451 A | * | 9/1979 | Salera | ........................ 600/549 |
| 4,235,051 A | * | 11/1980 | Spekman, Jr. | ................. 451/35 |
| 5,153,555 A | * | 10/1992 | Enomoto et al. | ......... 338/22 R |
| 5,714,924 A | * | 2/1998 | Takeuchi et al. | .......... 338/22 R |
| 5,760,336 A | * | 6/1998 | Wang | ........................ 174/52.1 |
| 5,777,509 A | | 7/1998 | Gasparik | |
| 5,945,903 A | * | 8/1999 | Reddy et al. | ................ 337/197 |
| 6,100,745 A | | 8/2000 | Dougherty | |
| 6,122,154 A | | 9/2000 | Damerow et al. | |
| 6,144,286 A | | 11/2000 | Moos et al. | |
| 6,148,258 A | | 11/2000 | Boisvert et al. | |
| 6,153,948 A | | 11/2000 | Cogan et al. | |
| 6,208,233 B1 | * | 3/2001 | Stein, Sr. et al. | ............ 338/195 |
| 6,215,638 B1 | | 4/2001 | Figueiredo et al. | |
| 6,232,868 B1 | | 5/2001 | Rehnelt | |
| 6,236,550 B1 | * | 5/2001 | Mochida et al. | ............. 361/106 |
| 6,239,523 B1 | | 5/2001 | Janicek et al. | |
| 6,249,104 B1 | | 6/2001 | Janicek | |

* cited by examiner

Primary Examiner—Karl D. Easthom
(74) Attorney, Agent, or Firm—Karl A. Vick, Esq.; Armstrong Teasdale LLP

(57) ABSTRACT

A method for retaining a terminal of a terminal assembly for a positive temperature coefficient resistor/overload resistor (PCTR/OL) assembly includes providing a body having an inner surface, and disposing at least one retaining member to the inner surface. The retaining member is configured to engage the terminal substantially perpendicular to an axis of symmetry of the terminal.

25 Claims, 7 Drawing Sheets

US 6,670,881 B1

POSITIVE TEMPERATURE COEFFICIENT RESISTOR/OVERLOAD RESISTOR METHOD AND ASSEMBLIES

BACKGROUND OF INVENTION

This invention relates generally to electric motors, and, more particularly, to a motor starting device.

At least some known electric motors include a start or auxiliary winding and a run winding. The start or run winding is used to initiate rotation of a motor rotor. More specifically, when the start and run windings are energized, a geometric and time phase relationship between magnetic fields generated by the run and start windings, and the magnetization of the rotor, cause the rotor to begin rotating from a standstill condition. Once the rotor has sufficient torque to attain its normal running speed, the start winding is disconnected from the motor circuit.

Start and run capacitors are sometimes used to change the time phase relationship between magnetic fields generated by the run and start or auxiliary windings. Typically, start and run capacitors are utilized in two capacitor or capacitor start capacitor-run motors. Additionally, rather than disconnecting the start winding once sufficient rotor torque is attained, the start winding can be utilized as an auxiliary run winding after motor start-up if a run capacitor is connected in series with the start winding. Using an auxiliary run winding facilitates improving motor efficiency and power factor.

A motor starting switch may be used to control energizing and de-energizing the motor start winding or start capacitor connection with an auxiliary winding. At least some known motors include a positive temperature coefficient resistor/ over load resistor (PTCR/OL) to perform this switching function. For example, PTCR/OLs have been used particularly for many compressor motor applications.

One known method of securing the PTCR/OL onto a compressor is with a bail strap. The bail strap is a piece of formed spring wire that attaches to holes or slots in a compressor fence and presses against the PTCR/OL, thereby, biasing the PTCR/OL between the bail strap and a compressor shell. The bail strap prevents the PTCR/OL from disengaging from the compressor terminals due to vibration. A run capacitor is attached to the PTCR/OL, and the bail strap extends around both of them to keep the run capacitor and the PTCR/OL secured to the compressor shell.

Because of the different sizes of PTCR/OLs and capacitors, different sized straps are used for different compressor fences. Moreover, the formed spring wire bail strap may tangle and make it difficult to separate. More specifically, because the bail strap is a spring, considerable force may be required to bend it into shape for assembly onto the compressor shell and PTCR/OL.

Furthermore, as the retention force induced to the terminals increases, the removal force from the terminals is also increased, thus increasing a difficulty of assembly of the compressor. Increasing the retention force also increases an amount of stress induced to the socket material, which may cause the socket to deform. As a result, only a limited increase in retention force is possible. Moreover, lubrication that may be present on the compressor terminals may reduce the retention force available to hold the terminals to the sockets.

SUMMARY OF INVENTION

In one aspect, a method for retaining a terminal of a terminal assembly for a positive temperature coefficient resistor/overload resistor (PCTR/OL) assembly is provided. The method includes providing a body having an inner surface, and disposing at least one retaining member to the inner surface. The retaining member is configured to engage the terminal substantially perpendicular to an axis of symmetry of the terminal.

In another aspect, a positive temperature coefficient resistor/overload resistor (PCTR/OL) assembly includes a body having an inner surface including at least one opening therethrough. The opening is sized to receive a terminal of a terminal assembly. The PCTR/OL assembly also includes at least one retaining member attached to the inner surface. The retaining member is configured to engage the terminal substantially perpendicular to an axis of symmetry of the terminal.

In yet another aspect, a positive temperature coefficient resistor/overload resistor (PTCR/OL) assembly includes a body having an inner surface including at least one opening therethrough sized to receive a terminal of a terminal assembly. The assembly also includes at least one retaining member attached to the inner surface, and at least one conducting member having a terminal engaging end positioned within the body. The terminal engaging end includes a lance. The retaining member is electrically isolated from the conducting member.

In a further aspect, a PTCR/OL retaining system includes first retaining means for retaining a terminal substantially perpendicular to an axis of symmetry of the terminal. The system also includes second retaining means for retaining the terminal substantially parallel the terminal axis of symmetry.

DETAILED DESCRIPTION

Figure 1:
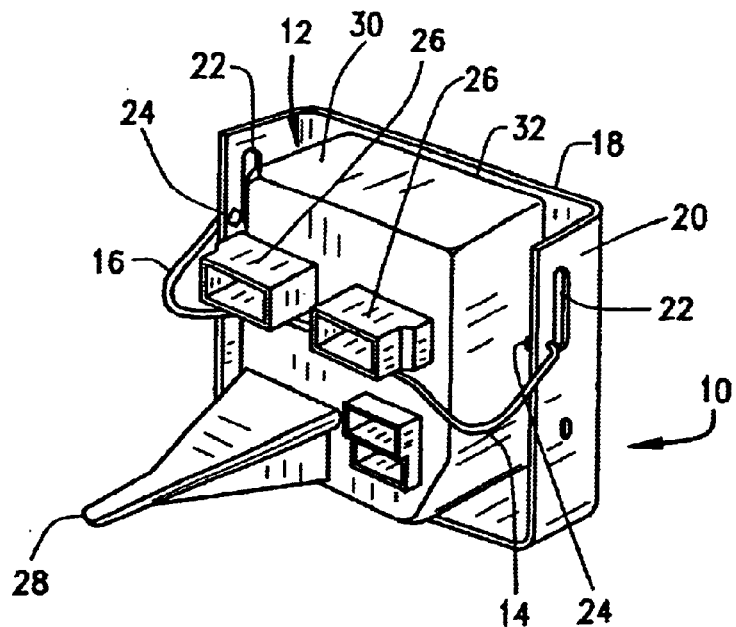
FIG. 1 is a perspective view of a known PTCR/OL mounting system.

FIG. 1 is a perspective view of a known positive temperature coefficient resistor/overload resistor (PTCR/OL) mounting system 10. A PTCR/OL assembly 12 is mounted to a compressor fence 14 using a bail strap 16. Compressor fence 14 is mounted to a compressor wall 18 of a compressor 20 in a conventional manner, and compressor fence 14 includes a plurality of apertures 22 for receiving and engaging one or more curved end portions 24 of bail strap 16. Bail strap 16 is resilient such that assembly 12 is secured against compressor fence 14. Assembly 12 includes a plurality of connector passageways 26 and an alignment member 28. Assembly 12 also includes a cover 30 and a base 32 attached to cover 30.

During operation of compressor 20, compressor 20 may vibrate and bail strap 16 facilitates maintaining assembly 12 against compressor fence 14 such that the vibrations do not cause assembly 12 to separate from compressor fence 14. Additionally, during shipping of compressor 20, compressor 20 may vibrate and bail strap 16 facilitates maintaining assembly 12 against compressor fence 14 during shipping.

Figure 2:
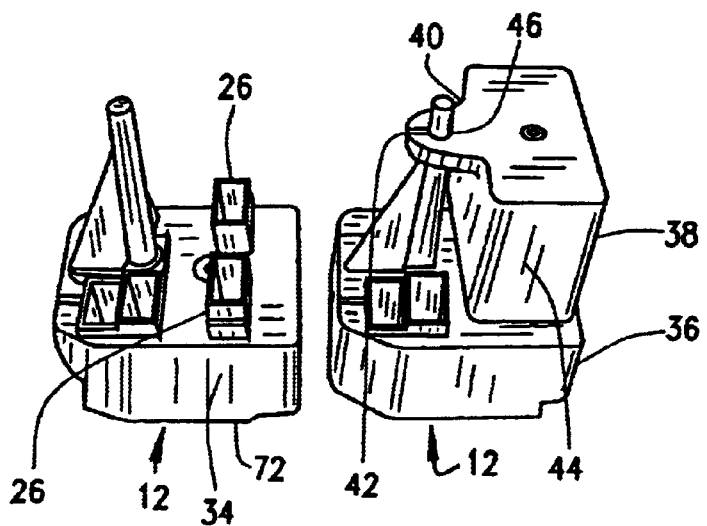
FIG. 2 is a perspective view of a plurality of the assemblies shown in FIG. 1.

FIG. 2 is a perspective view of a plurality of assemblies 12 (shown in FIG. 1) including a first assembly 34 and a second assembly 36. A capacitor 38 is mounted to second assembly 36 via connector passageways 26. Capacitor 38 includes a mating member 40 including a distal end 42 and a slot 44 that extends from distal end 42 and terminates at an opening 46 sized to receive alignment member 28.

Figure 3:
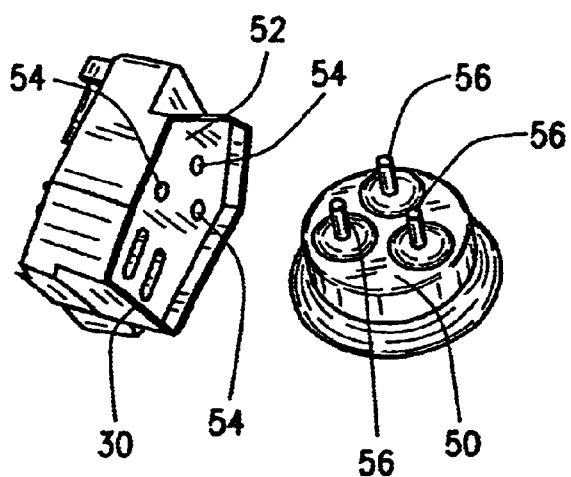
FIG. 3 is a perspective view of a base of an assembly shown in FIG. 1 and a compressor terminal assembly.

FIG. 3 is a perspective view of base 30 of assembly 12 (shown in FIG. 1) and a compressor terminal assembly 50. Base 30 includes a compressor side surface 52 that includes a plurality of openings 54 extending therethrough and are sized to receive a plurality of terminals 56 extending from terminal assembly 50. Terminal assembly 50 is mounted on compressor wall 18 (shown in FIG. 1), and compressor fence 14 is also mounted on compressor wall 18, as shown in FIG. 1.

Figure 4:
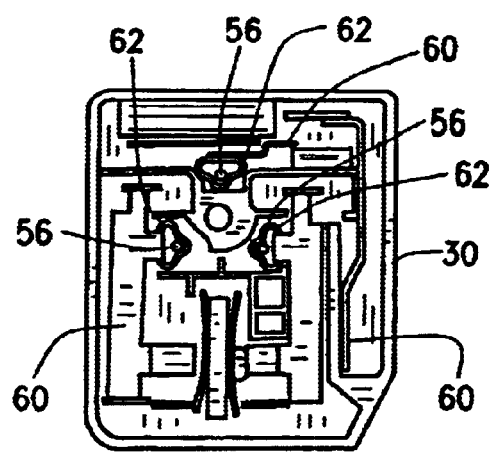
FIG. 4 is a plan view of the base shown in FIG. 1 engaged with the terminal assembly shown in FIG. 3.

FIG. 4 is a plan view of base 30 engaged with terminal assembly 50 (only terminals 56 of terminal assembly 50 are visible in FIG. 4). Terminals 56 extend through openings 54 to a plurality of conducting members 60. Each conducting member 60 includes a terminal engaging end 62 that facilitates frictionally retaining terminals 56, such that terminals 56 maintain electrical contact with conducting members 60 during non-vibrational periods of operation. However, terminal engaging ends 62 do not frictionally retain terminals 56 sufficiently that terminals 56 maintain electrical contact with conducting members 60 during some vibrational periods, particularly during high vibrational periods. Accordingly, it is known to use bail strap 16 to resiliently maintain terminals 56 in electrical contact with conducting members 60 such that vibrations will not cause terminals 56 to separate from conducting members 60.

Figure 5:
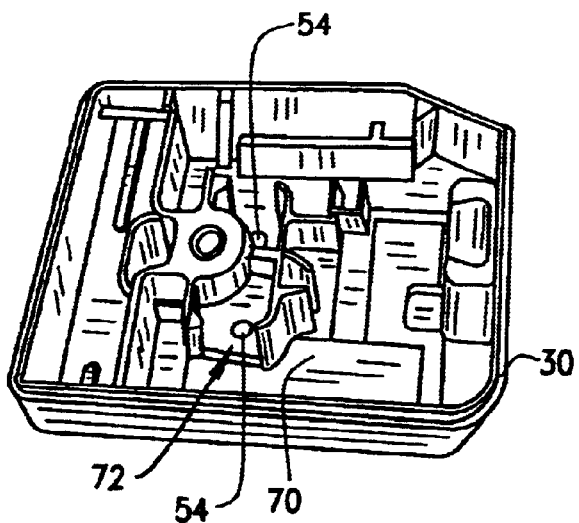
FIG. 5 is a perspective view of the base shown in FIG. 3 with the conducting members shown in FIG. 4 removed.

FIG. 5 is a perspective view of base 30 with conducting members 60 (shown in FIG. 4) removed. Base 30 includes an inner surface 70 including at least one ledge 72 that is proximate one or more openings 54.

Figure 6:
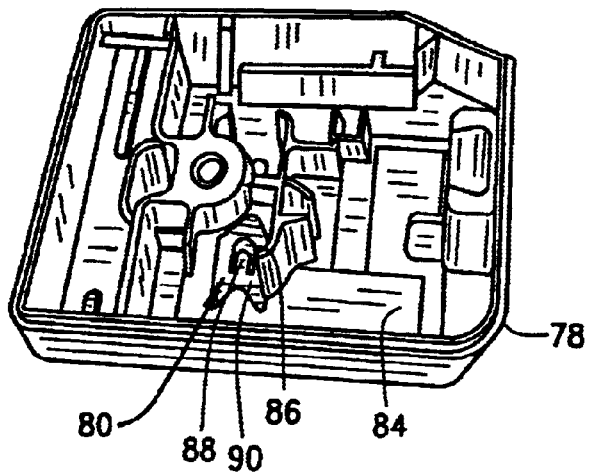
FIG. 6 is a perspective view of a base in accordance with one embodiment of the invention.

FIG. 6 is a perspective view of a base 78 in accordance with one embodiment of the invention. Base 78 includes a retaining member 80 that is mounted to an inner surface 84 of base 78. Retaining member 80 includes an opening 86 that is sized to receive and frictionally engage terminals 56 of compressor terminal assembly 50 (shown in FIG. 3). Retaining member 80 includes a retaining finger 88 that obliquely extends from a retainer body 90.

In an exemplary embodiment, base 78 is fabricated by removing at least one ledge 72 from base 30 and disposing retaining member 80 where ledge 72 was. In one embodiment, retaining member 80 is attached to inner surface 84 by adhering with an adhesive. In alternative embodiments, retaining member 80 is attached other than using an adhesive, such as, for example, but not limited, using a screw and or a bolt to attach retaining member 80 inner surface 84. Alternatively, retaining member 80 is attached to inner surface 84 by at least one of soldering, welding, bonding, molding, keying, peening, and friction fitting. In the exemplary embodiment, retaining member 80 is a first retaining means. Alternatively, the first retaining means is other than retaining member 80.

Figure 7:
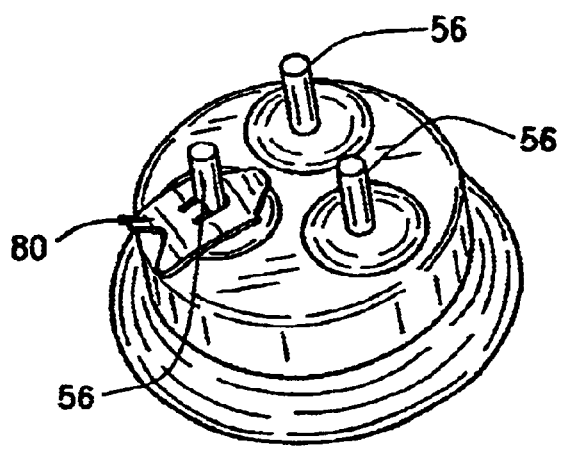
FIG. 7 is a perspective view of the retaining member shown in FIG. 6 engaging and frictionally retaining a terminal of the compressor assembly shown in FIG. 3.
Figure 8:
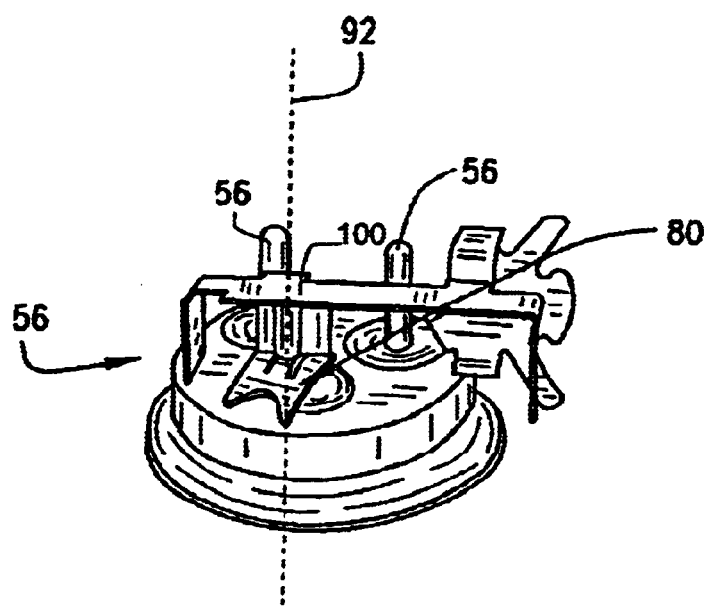
FIG. 8 is an alternate perspective view of the retaining member shown in FIG. 6 engaging and frictionally retaining a terminal of the compressor assembly shown in FIG. 3.

FIGS. 7 and 8 are perspective views of retaining member 80 engaging and frictionally retaining a terminal 56 of compressor assembly 50. Retaining finger 88 engages terminal 56 substantially perpendicular to a longitudinal axis of symmetry 92 of terminal, as opposed to terminal engaging ends 62 (shown in FIG. 4) which engage terminal 56 substantially parallel to longitudinal axis of symmetry 92.

Figure 9:
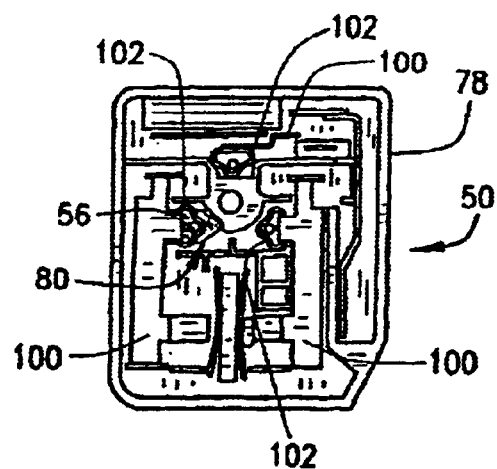
FIG. 9 is a plan view of the base shown in FIG. 6 wherein the retaining member is engaged to a terminal of the compressor assembly shown in FIG. 3.

FIG. 9 is a plan view of base 78 including retaining member 80 engaged to a terminal 56 of compressor assembly 50. Base 78 also includes a plurality of conducting members 100 each including a terminal engaging end 102. Terminal engaging ends 102 frictionally retain terminals 56 and retaining member 80 frictionally retains at least one terminal 56 such that electrical contact between terminals 56 and conducting members 100 is maintained during high vibration periods. In one embodiment, base 78 includes more than one retaining member 80. In the exemplary embodiment, terminal engaging end 102 is a second retaining means. Alternatively, the second retaining means is other than terminal engaging end 102. When terminal assembly 50 is separated from base 78 such that terminals 56 do not extend through openings 86, retaining member 80 is electrically isolated from conducting members 100. In an alternative embodiment, retaining member 80 is electrically connected to one conducting member 100.

Figure 10:
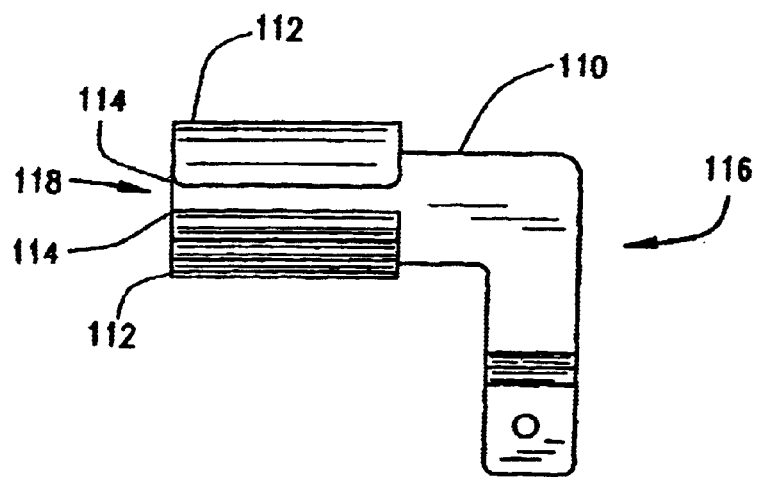
FIG. 10 is a plan top view of a terminal engaging end shown in FIG. 4.
Figure 11:
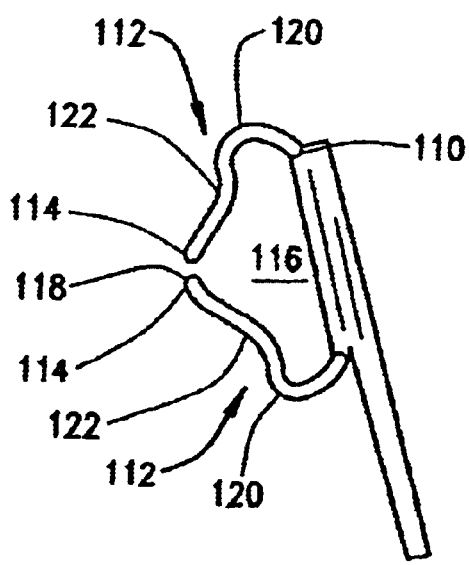
FIG. 11 is a perspective view of the terminal engaging end shown in FIG. 4.

FIG. 10 is a plan top view of terminal engaging end 62 and FIG. 11 is a perspective view of terminal engaging end 62 (shown in FIG. 4). Terminal engaging end 62 includes a planer surface 110 and a plurality of arcuate sections 112 that extend from planer surface 110 to ends 114 defining a terminal receiving channel 116. Ends 114 are proximate each other and not contacting each other defining a slot 118. Each arcuate section 112 includes an outward arcuate portion 120 and an inward arcuate portion 122. Terminal receiving channel 116 is sized to frictionally secure a terminal 56 as explained above. However, terminal receiving channel 116 does not frictionally retain terminal 56 sufficiently that terminal 56 maintain electrical contact with conducting member 60 during some vibrational periods, particularly during high vibrational periods such as during shipping.

Figure 12:
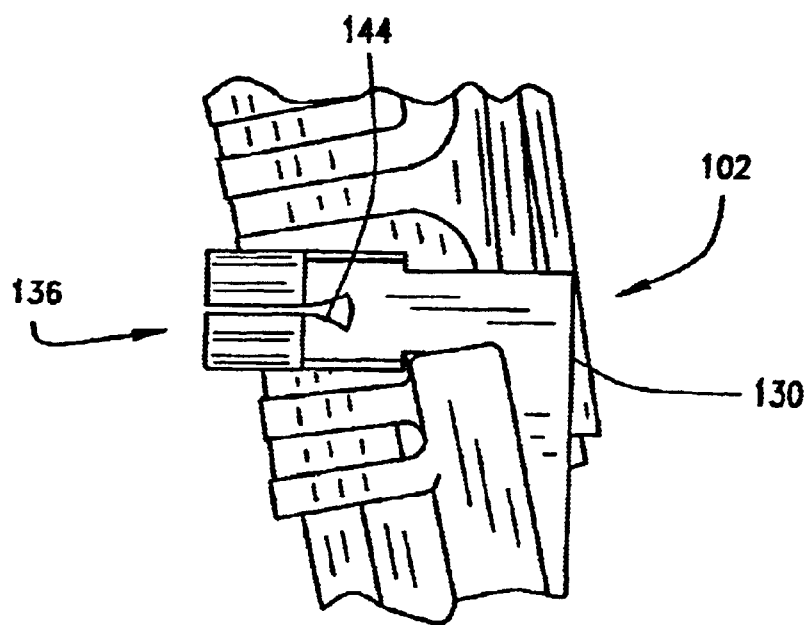
FIG. 12 is a plan top view of a terminal engaging end shown in FIG. 9.
Figure 13:
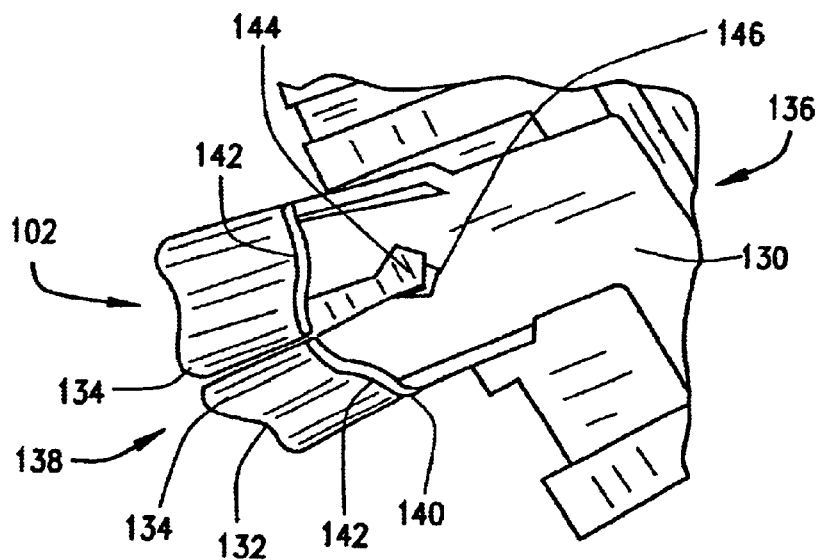
FIG. 13 is a perspective view of the terminal engaging end shown in FIG. 9.

FIG. 12 is a plan top view of terminal engaging end 102 and FIG. 13 is a perspective view of terminal engaging end 102 (shown in FIG. 9). Terminal engaging end 102 includes a planer surface 130 and a plurality of arcuate sections 132 that extend from planer surface 130 to ends 134 defining a terminal receiving channel 136. Ends 134 are proximate each other and not contacting each other defining a slot 138. Each arcuate section 132 includes an outward arcuate portion 140 and an inward arcuate portion 142. Planer surface 130 includes a lance 144 thereon. Lance 144 includes a raised edge 146 which facilitates frictional contact with terminal 56. Terminal receiving channel 136 is sized to frictionally secure terminal 56. Additionally, lance 144 facilitates securing terminal 56 such that terminal 56 maintains electrical contact with conducting member 1 during some vibrational periods that might cause loss of electrical contact without lance 144.

In one embodiment, several terminal engaging ends 102 include lance 144. In an exemplary embodiment, only one terminal engaging end 102 includes lance 144, and the one terminal engaging end 102 engages a terminal 56 which is electrically common. Additionally, in other embodiments, lance 144 is a protrusion and instead of having raised edge 146, lance 144 includes a raised central portion (not shown).

Figure 14:
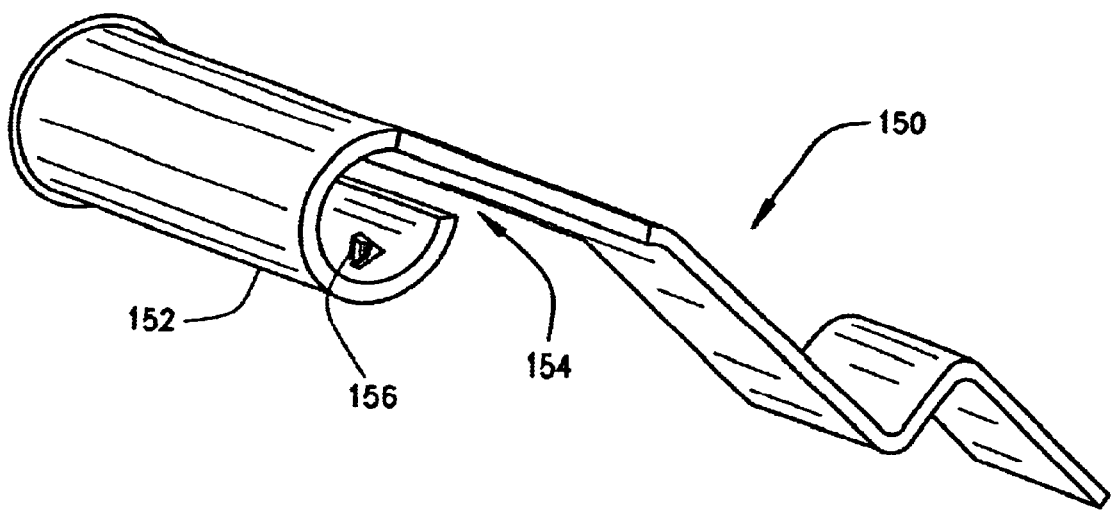
FIG. 14 is a perspective view of a conducting member that includes a terminal engaging end.

FIG. 14 is a perspective view of a conducting member 150 including a terminal engaging end 152. Terminal engaging end 152 is generally arcuate and extends proximate and spaced from conducting member 150 to define a slot 154. At least one lance 156 is positioned on terminal engaging end 152. Lance 156 extends from terminal engaging end 152 to facilitates frictional contact with terminal 56. Additionally, lance 156 facilitates securing terminal 56 such that terminal 56 maintains electrical contact with conducting member 150 during some vibrational periods that might cause loss of electrical contact without lance 156.

While the invention has been described in terms of various specific embodiments, those skilled in the art will recognize that the invention can be practiced with modification within the spirit and scope of the claims.

What is claimed is:

1. A method for retaining a terminal of a terminal assembly for a positive temperature coefficient resistor/overload resistor (PTCR/OL) assembly, said method comprising:

providing a PTCR/OL assembly body comprising an inner surface and a terminal opening therethrough;

disposing at least one retaining member to the body inner surface, the at least one retaining member including a central aperture substantially aligned with respect to the terminal opening, and a distal end extending from a perimeter of the central aperture, the retaining member distal end extends radially toward the central aperture and the terminal opening, and at least partially blocks the central aperture and the terminal opening, the retaining member distal end is flexible and is displaceable in a direction of insertion of a terminal to enable the retaining member to engage the terminal substantially perpendicular to a longitudinal axis of symmetry of the terminal when the terminal is inserted axially through the opening, and disposing at least one conductor member within the body, the conductor member includes a planar surface having an arcuate tab extending from each opposing end of the planar surface, the planar surface and tabs defining an opening that is substantially axially aligned with respect to the terminal opening and the central aperture.

2. A method in accordance with claim 1 wherein disposing at least one conductor member within the body comprises disposing at least one conductor member within the body such that the conductor member is electrically isolated from the retaining member.

3. A method in accordance with claim 1 wherein disposing at least one conductor member within the body comprises disposing at least one conductor member having a terminal engaging end within the body such that the conductor member is electrically isolated from the retaining member.

4. A method in accordance with claim 1 wherein disposing at least one conductor member within the body comprises disposing at least one conductor member having a terminal engaging end within the body such that the conductor member is electrically isolated from the retaining member, the terminal engaging end configured to engage the terminal substantially parallel the axis of symmetry of the terminal.

5. A method in accordance with claim 1 wherein said disposing at least one retaining member comprises disposing at least one retaining member including a retaining finger extending obliquely from a retainer body into an opening, the retaining finger configured to engage the terminal substantially perpendicular to an axis of symmetry of the terminal.

6. A method in accordance with claim 1 further comprising inserting the terminal through the terminal opening, the central aperture, and the conductor member opening such that the terminal engages the distal end and displaces the distal end in a direction of insertion of the terminal thereby imparting a bias force to the distal end, in a direction opposite the direction of insertion of the terminal, that binds the terminal between the distal end and the central aperture perimeter and facilitates axially retaining the terminal in the direction of insertion.

7. A positive temperature coefficient resistor/overload resistor (PTCR/OL) assembly comprising:

a PTCR/OL body comprising an inner surface and at least one terminal opening extending therethrough and sized to receive a terminal of a terminal assembly having at least one terminal extending therefrom;

at least one retaining member attached to said body inner surface, said at least one retaining member including a central aperture substantially aligned with respect to said terminal opening, and a distal end extending from a perimeter of said central aperture, the retaining member distal end extends radially toward said central aperture and said terminal opening, and at least partially blocks said central aperture and said terminal opening, said retaining member distal end is flexible and is displaceable in a direction of insertion of the terminal to enable the retaining member to engage the terminal substantially perpendicular to a longitudinal axis of symmetry of the terminal when the terminal is inserted axially through the opening; and at least one conductor member within said body, said conductor member including a planar surface having an arcuate tab extending from each opposing end of said planar surface, said planar surface and tabs defining an opening that is in substantial axial alignment with respect to said terminal opening and said central aperture.

8. A (PTCR/OL) assembly in accordance with claim 7 further comprising a plurality of conductor members positioned within said body such that said conductor members electrically isolated from said retaining member.

9. A (PTCR/OL) assembly in accordance with claim 7 further comprising a plurality of conductor members positioned within said body such that said conductor members are electrically coupled to said retaining member.

10. A (PTCR/OL) assembly in accordance with claim 8 wherein each said conductor members comprises a terminal engaging end.

11. A (PTCR/OL) assembly in accordance with claim 10 wherein each said terminal engaging end is configured to engage a terminal substantially parallel to the axis of symmetry of the terminal.

12. A (PTCR/OL) assembly in accordance with claim 7 wherein said retaining member comprises a retaining finger extending obliquely from a retainer body and configured to engage the terminal substantially perpendicular to the axis of symmetry of the terminal.

13. A positive temperature coefficient resistor/overload resistor (PTCR/OL) assembly comprising:

a PTCR/OL body comprising an inner surface comprising at least one terminal opening therethrough, said opening sized to receive a terminal of a terminal assembly;

at least one terminal retaining member coupled to said inner surface, said at least one terminal retaining member includes a central aperture substantially aligned with respect to said terminal opening, and a distal end extending from a perimeter of said central aperture, said retaining member distal end extends radially toward said central aperture and said terminal opening, and at least partially blocks said central aperture and said terminal opening, said retaining member distal end is flexible and is displaceable in a direction of insertion of the terminal to enable the retaining member to engage the terminal substantially perpendicular to a longitudinal axis of symmetry of the terminal after the terminal is inserted axially through the central aperature; and at least one conducting member comprising a terminal engaging end comprising at least one lance that protrudes from a planar surface of said terminal engaging end and extends toward said opening and at least partially blocks said opening, said lance is flexible and is displaceable in a direction of insertion of the terminal after the terminal is inserted axially through the central aperture, said terminal engaging end positioned within said body.

14. An assembly in accordance with claim 13 wherein said retaining member electrically isolated from said conducting member.

15. An assembly in accordance with claim 13 wherein said retaining member electrically coupled to said conducting member.

16. A PTCR/OL assembly in accordance with claim 13 wherein said retaining member configured to engage the terminal substantially perpendicular to an axis of symmetry of the terminal.

17. A PTCR/OL assembly in accordance with claim 16 wherein said terminal engaging end configured to engage the terminal substantially parallel to the axis of symmetry of the terminal.

18. A PTCR/OL assembly in accordance with claim 13 wherein said retaining member comprises a retaining finger extending obliquely from a body and configured to engage the terminal substantially perpendicular to an axis of symmetry of the terminal.

19. A compressor motor PTCR/OL retaining system comprising:

a first retaining means for retaining a compressor motor PTCR/OL terminal, said first retaining means positioned substantially perpendicular to a longitudinal axis of symmetry of the terminal and configured to flex in a direction of insertion of the terminal when the terminal is axially inserted through said first retaining means and configured to axially bind the terminal in a direction of retraction of the terminal; and a second retaining means for retaining the terminal, said second retaining means positioned substantially parallel the terminal longitudinal axis of symmetry after the terminal is inserted axially through the opening, said second retaining means positioned in substantial axial alignment with said first retaining means, said second retaining means configured to frictionally axially retain the terminal.

20. A PTCR/OL retaining system in accordance with claim 19 wherein said first retaining means positioned on an inner surface of a PTCR/OL base.

21. A PTCR/OL retaining system in accordance with claim 19 wherein said first retaining means electrically isolated from said second retaining means.

22. A PTCR/OL retaining system in accordance with claim 19 wherein said first retaining means electrically coupled to said second retaining means.

23. A PTCR/OL retaining system in accordance with claim 19 further comprising a plurality of additional second retaining means, said first retaining means electrically connected to at least one of said second retaining means.

24. A PTCR/OL retaining system in accordance with claim 19 further comprising a plurality of additional second retaining means, said first retaining means electrically isolated from all of said second retaining means, at least one of said second retaining means comprises a lance that protrudes from a planar surface of said second retaining means and extends toward said opening and at least partially blocks said opening.

25. A PCTR/OL retaining system in accordance with claim 22, further comprising a terminal electrically coupled to said first means and said second means.

* * * * *